United States Patent [19]

Jacobs et al.

[11] Patent Number: 5,694,595
[45] Date of Patent: Dec. 2, 1997

[54] REMOTE USER PROFILE MANAGEMENT ADMINISTRATION IN A COMPUTER NETWORK

[75] Inventors: Dwayne Charles Jacobs, Boca Raton, Fla.; Jesus Gerardo Ibanez, Austin, Tex.

[73] Assignee: International Business Machines, Corporation, Armon, N.Y.

[21] Appl. No.: 514,795

[22] Filed: Aug. 14, 1995

Related U.S. Application Data

[63] Continuation of Ser. No. 173,807, Dec. 23, 1993, abandoned.

[51] Int. Cl.⁶ .................................................. G06F 13/14
[52] U.S. Cl. ................. 395/609; 395/610; 395/187.01; 395/200.06; 395/200.12
[58] Field of Search .............................. 395/186, 200.06, 395/609, 610, 187.01, 200.12

[56] References Cited

U.S. PATENT DOCUMENTS

| | | | |
|---|---|---|---|
| 4,768,150 | 8/1988 | Chang et al. | 395/682 |
| 4,805,134 | 2/1989 | Calo et al. | 395/610 |
| 5,048,085 | 9/1991 | Abraham et al. | 380/23 |
| 5,058,000 | 10/1991 | Cox et al. | 395/610 |
| 5,072,370 | 12/1991 | Durdik | 395/184.01 |
| 5,239,648 | 8/1993 | Nukui | 395/610 |
| 5,263,157 | 11/1993 | Janis | 395/609 |
| 5,305,456 | 4/1994 | Boitana | 395/186 |
| 5,349,678 | 9/1994 | Morris et al. | 395/800 |
| 5,481,720 | 1/1996 | Loucks et al. | 395/187.01 |
| 5,560,008 | 9/1996 | Johnson et al. | 395/651 |

OTHER PUBLICATIONS

IBM Technical Disclosure Bulletin, vol. 32, No 12, May 1990, pp. 262, 263. List of IDS With No. Authorizations Under New ID Panel.

IBM Technical Disclosure Bulletin, vol. 34, No. 4B; Sep. 1991, pp. 387, 388., Named Pipes Make Operating System/2 Extended Edition Multi–User.

Research Disclosure, Oct. 1991, No. 330, Database Administrators Utility (DBA Platform).

*Primary Examiner*—Thomas G. Black
*Assistant Examiner*—Hosain T. Alam
*Attorney, Agent, or Firm*—Jeffrey S. LaBaw

[57] ABSTRACT

A security system interface which uses the message passing capability of the distributed application to send messages to remote copies of itself and the security system at the remote system to carry out the remote user profile administration function at the remote machine. A message for a remote user profile administration function is constructed in a syntax used by a distributed application. The message is sent by a local copy of the distributed application resident at a local system to a remote copy of the distributed application resident at a remote system. The message is translated by the security system interface resident at the remote system into a user profile function usable by the security system. Finally, the user profile function is performed by a security system resident at the remote system. In the preferred embodiment, the distributed application is a database management program and the message is a data structure containing information for the remote user profile administration function.

14 Claims, 7 Drawing Sheets

REMOTE USER PROFILE MANAGEMENT ADMINISTRATION IN A COMPUTER NETWORK

This application is a continuation of application Ser. No. 08/173,807 filed Dec. 23, 1993 and now abandoned.

BACKGROUND OF THE INVENTION

This invention relates generally to data processing systems in a network environment. More particularly, it relates to a method and system for administrating user profiles on remote machines in a distributed database environment.

It is common to couple a plurality of data processing systems in an interconnected computing network such as a Local Area Network (LAN) or Wide Area Network (WAN). With the increasing complexity and size of such computer networks, it is also recognized that data within the system and transmitted data between the nodes on the LAN must be protected against unauthorized disclosure, destruction and modification. Typically, a userid and a password are used in the authentication process to prove the legitimacy of the user attempting to logon. After authentication on the systems to which the user is allowed access, information can be passed between the personal computers on the network. Most security systems require a fair amount of user profile administration, e.g., the addition and deletion of users, changing user passwords, and user group related activities. In these networks, the geographic location of nodes can be widespread. It is not practical to physically travel from machine to machine to accomplish administrative tasks connected with the authentication procedure.

Many of these tasks can be performed by using LAN management software which are sometimes called Network Operating Systems (NOS). Typically, the NOS utilizes a domain controller to access the user accounts data base for user profile management related tasks. Only a network administrator has the necessary clearance to access and modify this information. Further, the network administrator is limited to the user profile information stored at the server. For companies with diverse and intensive client server needs, the investment in a "NOS" such as IBM OS/2 LAN Server™ is worthwhile.

However, some companies use only a few specialized applications through the network.

Companies which only use a distributed database manager or another distributed application do not want to incur the additional cost and associated overhead of a LAN management system. However, present day database management system and distributed applications do not provide the facility to remotely administer the user profile related information. Some application programs do provide local user profile management. For example, the User Profile Management (UPM) Facility, part of the Extended Services™ program which is offered by the IBM Corporation, provides authorization checking by means of a logon facility and local administration of user ID's and passwords. Authorization through UPM is necessary before the local system or remote systems may be utilized. UPM can be used to define a local user logon profile which stores information enabling a user logon to remote systems. However, UPM does not allow user profile administration services to remote systems on the network. The network administrator must go to each individual system to accomplish these administration services.

The present invention provides a remote administration means for a distributed application.

SUMMARY OF THE INVENTION

It is therefore an object of the invention to administrate a user profile for a remote machine through a distributed application.

It is another object of the invention to minimize the coding effort to allow remote user profile administration.

These and other related objects are accomplished by a security system interface which uses the message passing capability of the distributed application to send messages to remote copies of itself and the security system at the remote system to carry out the remote user profile administration function at the remote machine. A message for a remote user profile administration function is constructed in a syntax used by a distributed application. The message is sent by a local copy of the distributed application resident at a local system to a remote copy of the distributed application resident at a remote system. The message is translated by the security system interface resident at the remote system into a user profile function usable by the security system. Finally, the user profile function is performed by a security system resident at the remote system. In the preferred embodiment, the distributed application is a database management program and the message is a data structure containing information for the remote user profile administration function.

BRIEF DESCRIPTION OF THE DRAWINGS

This invention will become more easily understood by the following detailed description of a preferred embodiment of the invention with reference to the attached drawings, in which.

DETAILED DESCRIPTION OF THE DRAWINGS

The invention may be run on a collection of computers under a number of different operating systems. The computers in the network could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal* Systems/2 Model 50, 60 systems IBM Corporation, Part No. 68X2224 Order Number S68X-2224 and *Technical Reference Manual Personal Systems/2 (Model 80) IBM Corporation* Part No. 68X 2256 Order Number S68X-2254. One operating system which an IBM PS/2 personal computer may run is IBM's OS/2 2.0 (TM). For more information on the IBM OS/2 2.0 Operating System, the reader is referred to *OS/2 2.0 Technical Library, Programming Guide Vol.* 1, 2, 3 *Version* 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 are described in many publications of the IBM Corporation, for example, *RISC System/6000, 7073 and 7016 POWERstation and POWERserver Hardware Technical* reference, Order No. SA23-2644-00. The AIX operating system is described in *General Concepts and Procedure—AIX Version 3 for RISC System/6000* Order No. SC23-2202-00 as well as other publications of the IBM Corporation.

Figure 1:
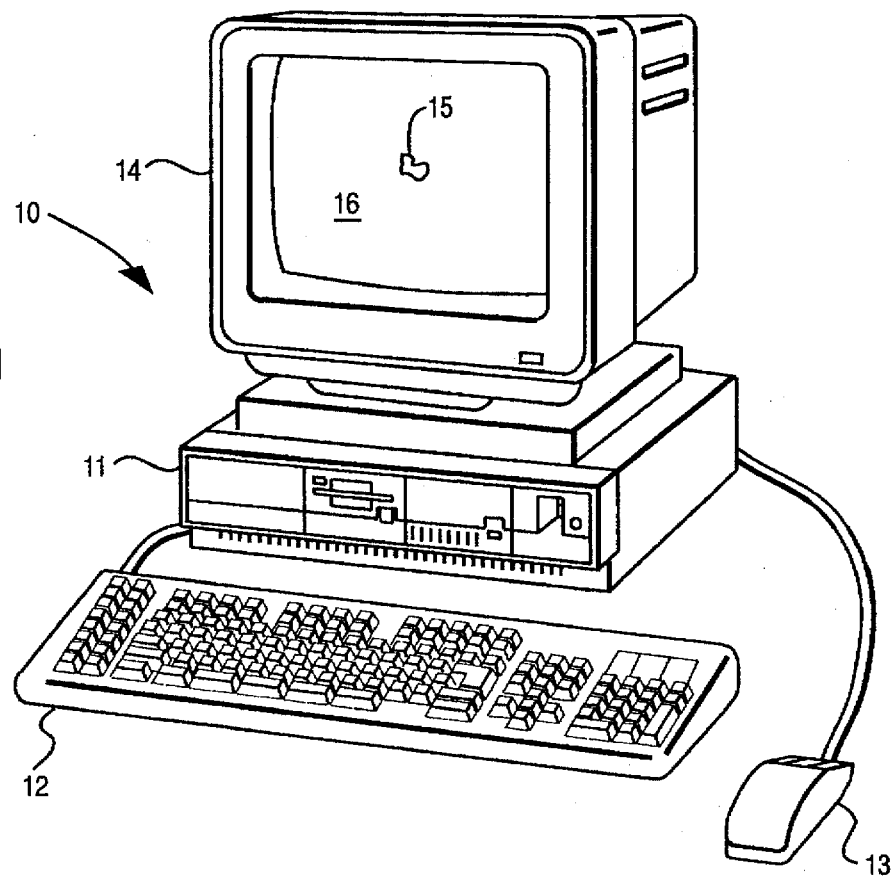
FIG. 1 shows a computer comprising a system unit, a keyboard, a mouse and a display.

In FIG. 1, a computer 10, comprising a system unit 11, a keyboard 12, a mouse 13 and a display 14 are depicted. The screen 16 of display device 14 is used to present the graphical user interface (GUI). The graphical user interface supported by the operating system allows the user to use a point and shoot method of input, i.e., by moving the mouse pointer 15 to an icon representing a data object at a particular location on the screen 16 and pressing one of the mouse buttons to perform a user command or selection.

Figure 2:
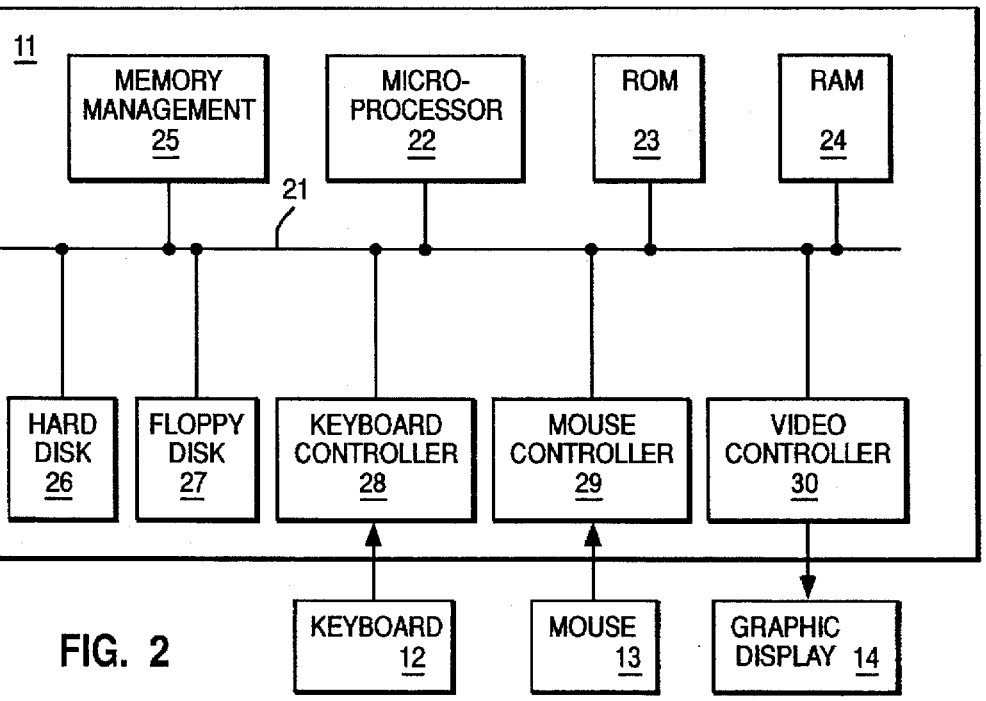
FIG. 2 is a block diagram of a components of the computer shown in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors included, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32, also coupled to the system bus 21, is used to store a large amount of data, e.g., a multimedia program or large database.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. The speakers 15a and 15b may be used to present audio objects to the user. An I/O controller 40 such as a Token Ring Adapter enables communication over a network 46 to other similarly configured data processing systems.

One of the preferred implementations of the present invention is as a set of instructions in a code module resident in the random access memory 24. Until required by the computer system, the set of instructions may be stored in another computer memory, for example, in the hard disk drive 26, in an optical disk for eventual use in the CD ROM 32 or in a floppy disk for eventual use in the floppy disk drive 27. The code modules in the computer memory are depcited in FIG. 4.

Figure 3:
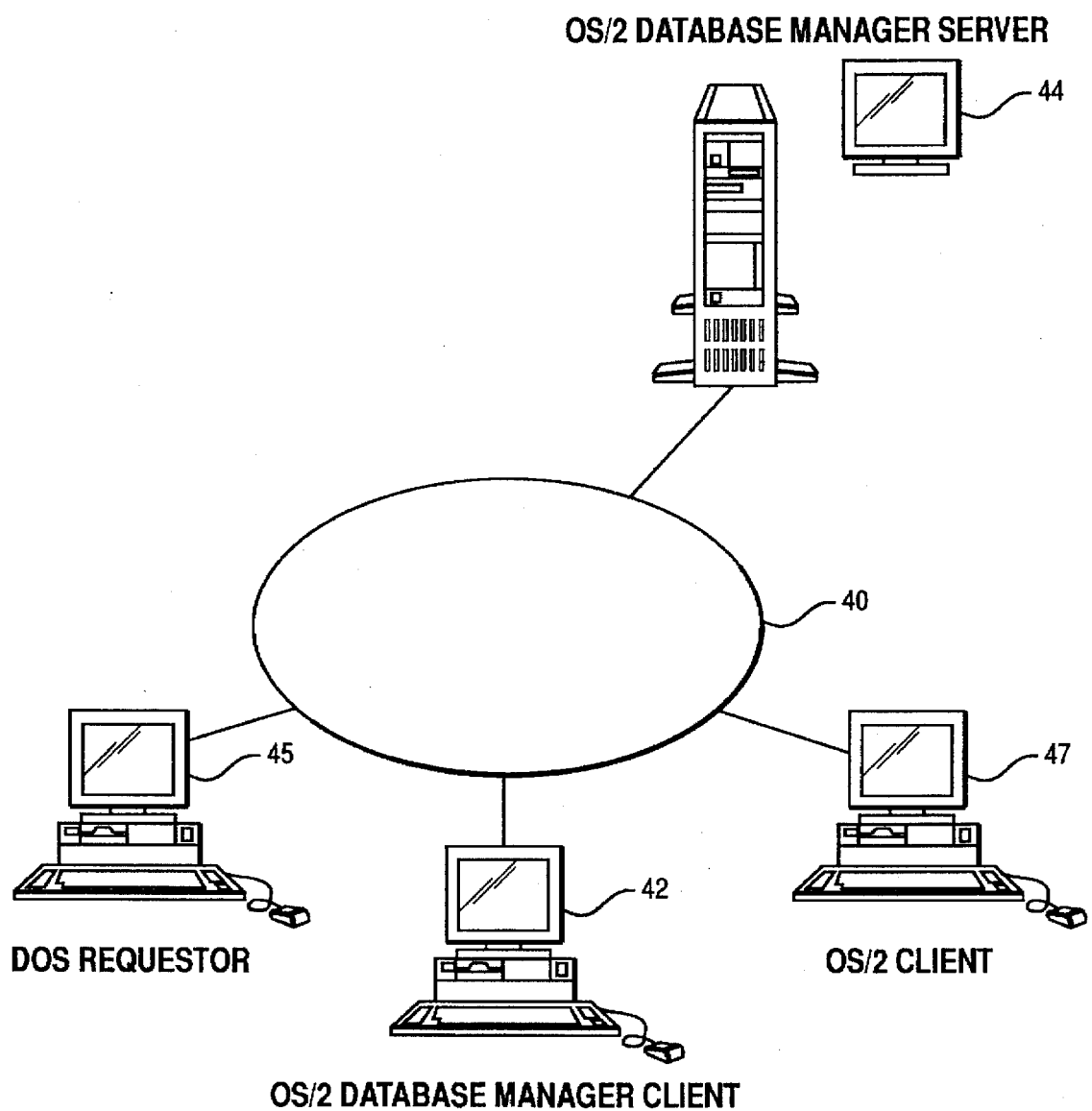
FIG. 3 is a simplified depiction of a Local Area Network coupled to client and database server systems.

FIG. 3 is a greatly simplified illustration of a Local Area Network in which the present invention is implemented. Typically, a network environment is much more complicated, consisting of different LAN technologies, multiple vendors and multiple adapters. Most vendors write to a variety of protocols according to the IEEE and International Standard Organization standards ISO 8802-2, ISO, 8802-3, ISO 8802-4, ISO 8802-5 and ISO 8802-7 to assure compatibility. The connection medium 40 is preferably, an IBM Token Ring, however, it could also be an Ethernet or PCNet or other type of LAN network. The OS/2 Database Manager Client System 42 is coupled to the LAN 40 and communicates to the OS/2 Database Manager Server System 44. Database Manager is used as an example, those skilled in the art would be able to extend the invention to other distributed applications. The Client System 42 can use the server system 44 for a variety of functions such as file sharing, distributed applications and databases, communications printing and other services. Other systems such as a DOS Requester 45 and the OS/2 Client 47 may be equipped with the present invention. It is also possible that these services would be divided on a plurality of servers coupled to the LAN 40 to optimize efficiency.

In the preferred embodiment, the security system resident on the client system 42 and server system 44 is the User Profile Management (UPM) Facility, which provides local user profile functions. UPM is part of the Extended Services™ program which is offered by the IBM Corporation. Extended Services comprises Communications Manager and Database Manager components which allow comprehensive communication and database functions within a network for computer systems which use the OS/2 operating system. Extended Services is described in many publications of the IBM Corporation including IBM Extended Services for OS/2 Hardware and Software Reference Order No. S04G-1014-00.

User Profile Management (UPM) is a security system which provides authorization checking by means of a logon facility and administration of user ID's and passwords. UPM always requires a user ID and usually also requires a password for access to the system. Authorization through UPM is necessary before the local system or remote systems may be utilized. UPM is local to each workstation and contains unique information specific to that system. To access a system either locally or remotely, the user's id and password must be defined through UPM on each system accessed. UPM can be used to define a user logon profile which stores information enabling user's logon to remote systems. The user logon profile contains, userid, password, the remote name of the system and the remote type of the system being accessed, e.g., LU 6.2. If the remote option is used, when the user logons on the local system, the user logon profile is activated to authorize access to the remote systems automatically. However, UPM does not provide automatic user profile update services to remote systems on the network. Further information on the present version of UPM may be found in IBM Extended Services for OS/2 Guide to User Profile Management (S04G-1114-00) available from the IBM Corporation and hereby incorporated by reference. This invention teaches certain improvements to the combination of Database Manager and UPM to provide remote administration services. While UPM and Database Manager are used in the preferred embodiment, those skilled in the art would recognize that other distributed applications and security systems can be improved according to the principles of the present invention.

Among the remote user profile administration functions added by the invention as follows:

Add a user,
Delete a user,
Return list of users,
Returns a user's information,
Set the user's information,
Set the user's password,
Return the group(s) of which a user is a member of,
Set a user to a group(s),
Return user Modal information,
Set user Modal information,
Validate a user's password,
Add a new group,
Delete a group,
Return list of group,
Add a user to a group,
Delete a user from a group,
Return list of users of a group,
Set a group to a list of users,
Return a group's information,
Set a group's information.

The invention utilizes the local user profile administration capabilities of UPM, together with the ability of database manager to pass data structures in a network to provide a remote user profile administration functions. Many of the functions listed above have corresponding and preexisting functions in UPM that are executable for the local system. However, as discussed above, with the present day configurations of these products the network administrator would be forced to go to system to system to perform these functions on a network-wide basis.

A sample table of remote user profile administration functions and the equivalent local UPM function follows:

| Remote User Profile Action | Equivalent UPM Function |
| --- | --- |
| SQL_ADD_USER | NetUserAdd |
| SQL_DELETE USER | NetUserDel |
| SQL_LIST USERS | NetUserEnum |
| SQL_GET_USER-INFO | NetUserGetInfo |
| SQL_GET_USER-INFO | NetUserSetInfo |
| SQL_CHANGE_PSWD | NetUserPasswordSet |
| SQL_USER_GET_GROUPS | NetUserGetGroups |
| SQL_USER_SET_GROUPS | NetUserGetGroups |
| SQL_VALIDATE_USER | NetUserValidate |
| SQL_GET_MODALS | NetUserModalsGet |
| SQL_SET_MODALS | NetUserModalsSet |
| SQL_ADD_GROUP | NetGroupAdd |

Figure 4:
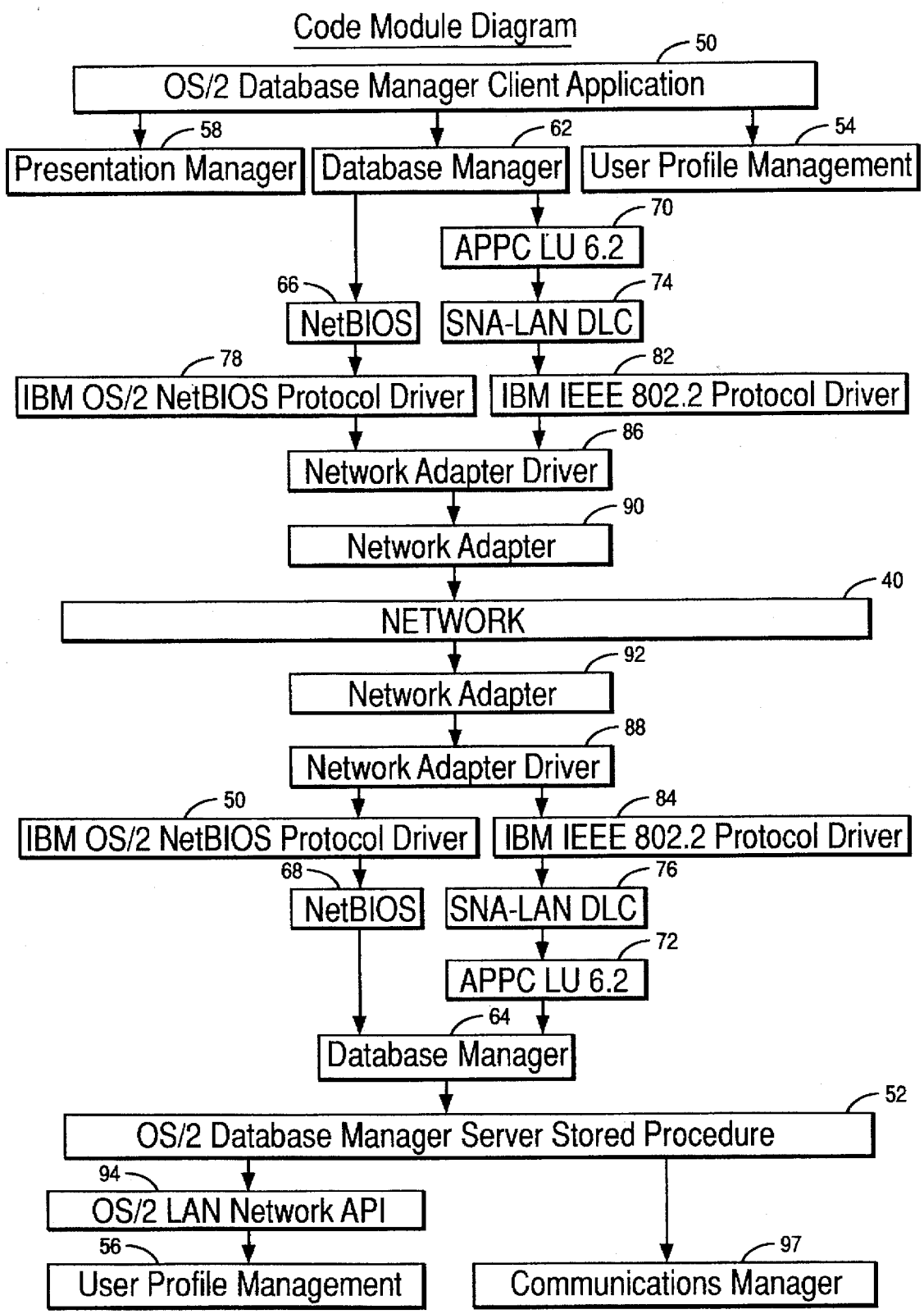
FIG. 4 is a code module diagram of the software code modules resident in the memories of the client and server systems.

FIG. 4 is an architectural block diagram of one preferred embodiment of the code modules resident in the client system and the server system. Most of the code modules are preexisting modules used for message transport, however, the figure is included to show one means of many to pass messages between the client and server portions of the remote user profile administrator. Generally, the software configuration is known as the LAN Adapter and Protocol Support (LAPS) and consists of network communication software to support LAN connectivity. LAPS is a combination of Network Driver Interface Specification (NDIS) compliant protocol drivers, NDIS compliant network adaptor drivers, Application Program Interface (API) support software and configuration and installation software for the drivers and is described *IBM Local Area Network Technical Reference* Order no. SC30-3383. In the preferred embodiment, the UPM APIs are configured as an OS/2 Database Manager Client application 50 in the client system and an OS/2 Database Manager Server stored procedure 52 at the server system. However, many alternative distributed architectures could be used without undue experimentation. The remote user profile administration API modules 50, 52 are coupled to the User Profile Management modules 54, 56 which provide system security at both workstations. Database Manager 62, 64 provides communication facilities to its applications including the security system interface as Database Manager client and server applications 50, 52. Database Manager 62, 64 can communicate with the network either through the NetBIOS 66, 68 or Advanced Program-to-Program Communication for LU 6.2 (APPC LU 6.2) and SNA LAN DLC 70, 72, 74, 76 which are coupled to 802.2 protocol drivers 78, 80, 82, 84 for logical link control communications to the Medium Access Control layer provided by the Network Adapter Drivers 86, 88. The Network Adapter Drivers are software modules that shield the other code modules in the system from the hardware interfaces of the Network Adapters 90, 92 and the Network.

Figure 5A:
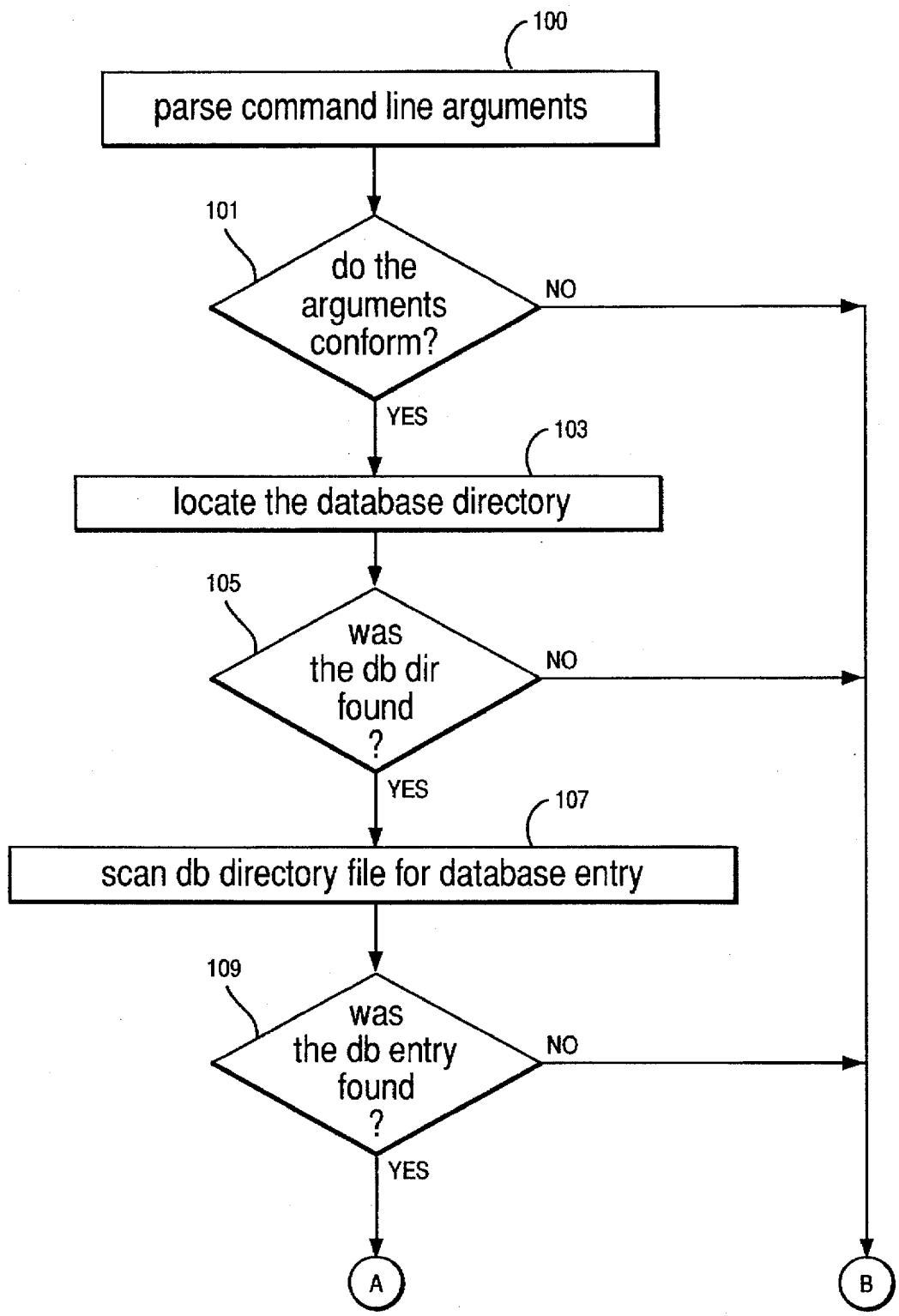
FIGS. 5A, 5B and 5C is a flow diagram, of the remote user profile administration process on the client system.
Figure 5B:
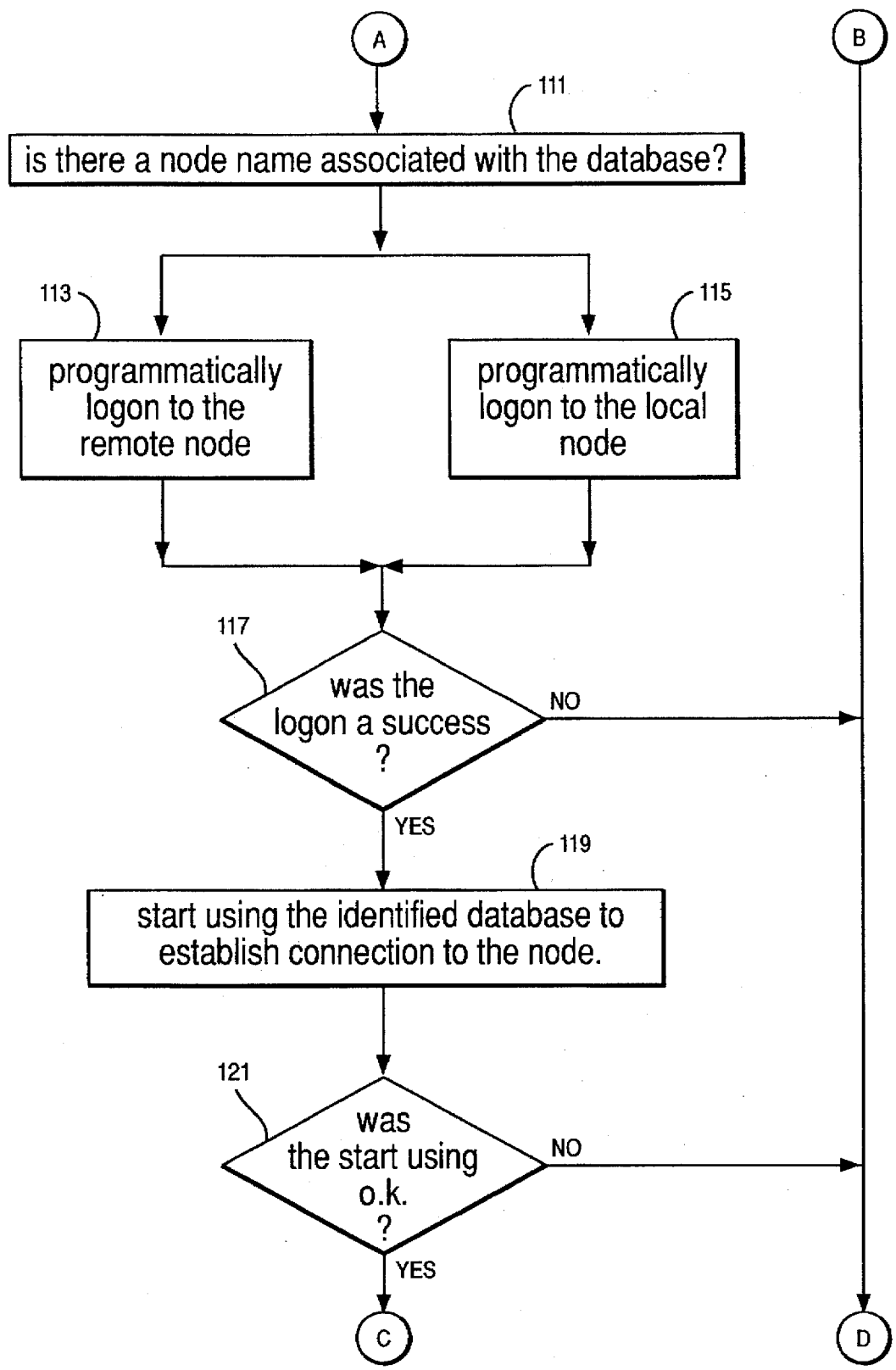
Figure 5C:
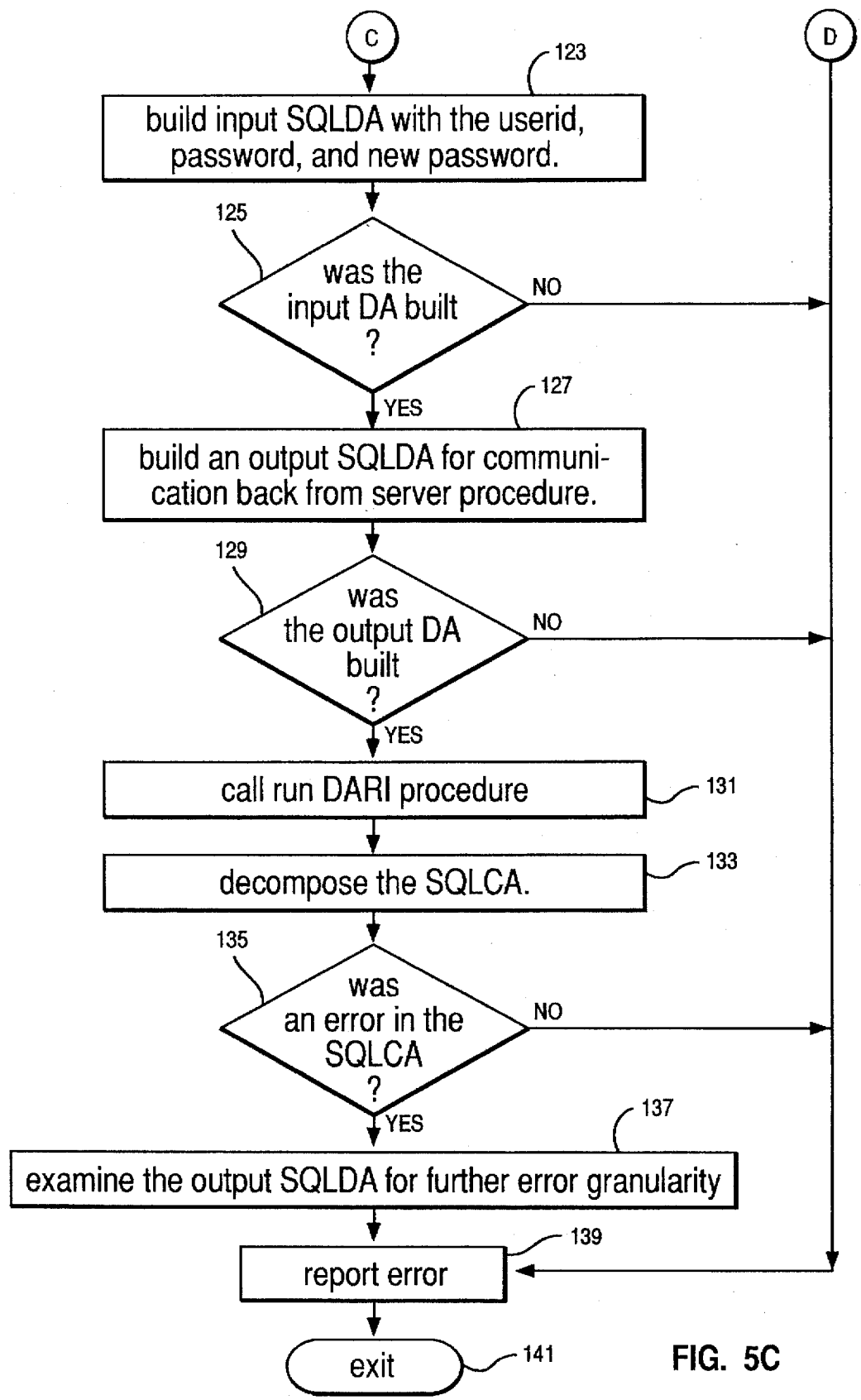

FIGS. 5a–5c are flow diagrams of one preferred embodiment of the generic user profile administration process steps which take place on the client system.

The process begins in steps 100 and 101 where the interface parameters which the administrator has sent for the remote user profile administration are tested to verify that they are valid inputs. If they conform to the Database Manager format, in step 103, the local system is searched for the remote database, to which the local node can connect: These entries describe certain characteristics of the remote database including information as to which node the database physically resides. In steps 107 and 109, each database directory entry is scanned in search of the node name passed in the parameter list. The node name is in the database directory only if the database is remote, that is on another node. In step 111, if the remote node was found, in step 113, a programmatic logon will occur for the remote node. A programmatic logon puts an entry in the local Requester Access Table (RAT) identifying it as a remote logon. If the node name was not found, in step 111, a programmatic logon will be done in step 115 for the local node which puts an entry in the RAT identifying it as a local logon.

In step 119, if the logon was successful, a start using database function is performed for the database associated with the node name. The start using database function is performed to accomplish the connection to the identified node. In step 121, if the start using database function was successful, an input SQL Data Area (SQLDA) is built in step 123 with the pertinent information for the desired UPM function. In step 125, if the input SQLDA was built successfully, an output SQLDA is built in step 127 for communication pertinent data back from the remote node based on the UPM function. In step 129, if the output SQLDA was built successfully, in step 131 a call to Database Remote Application Interface (DRAI) is done to invoke the remote DRAI procedure. In step 133, the SQLCA is examined to determine if the UPM function on the remote node was successful. If the DRAI function was successful, the function will exit to step 139. If there was an error, the SQLDA is examined for further error information in step 137 before existing to step 139.

Figure 6:
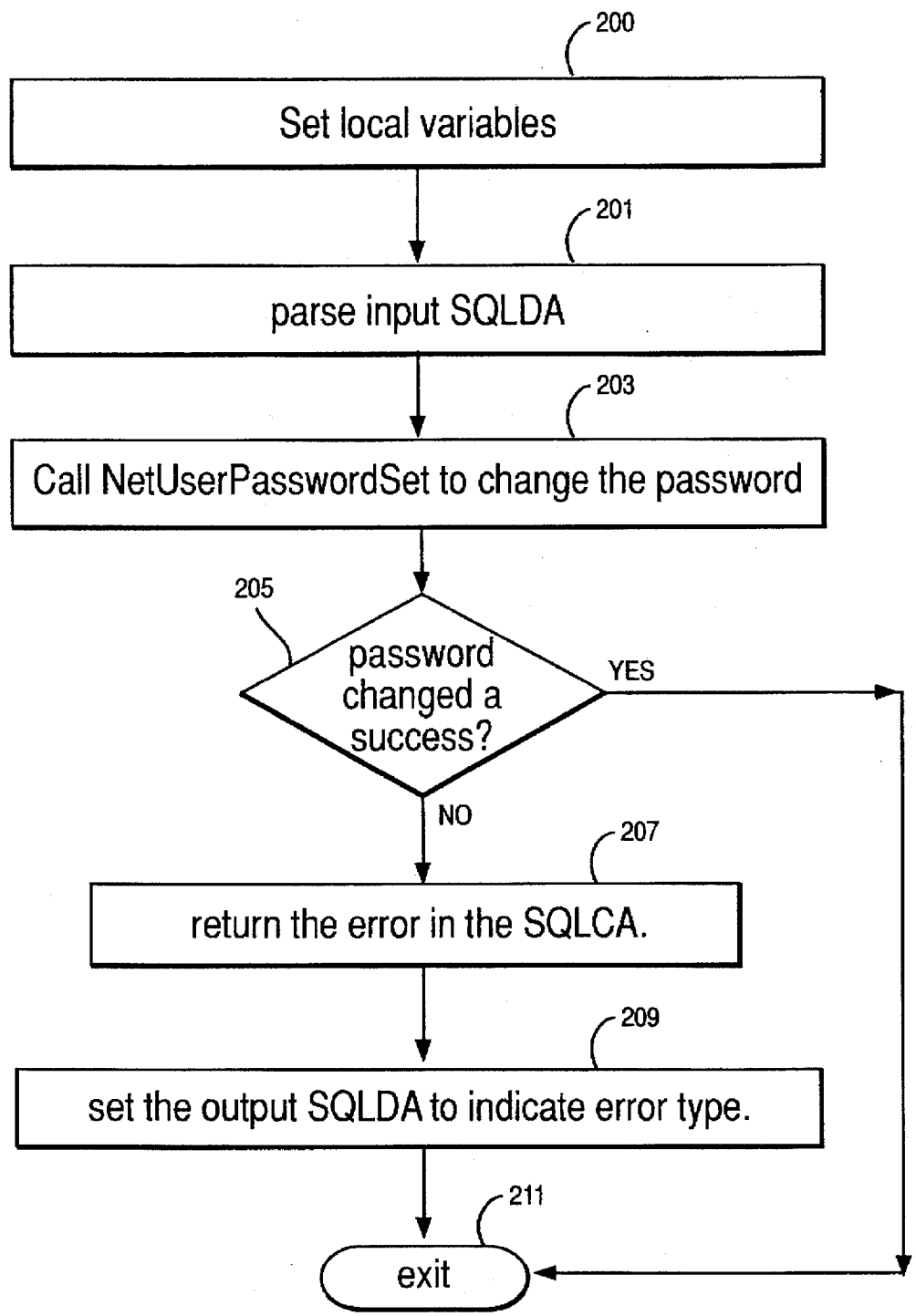
FIG. 6 is a flow diagram of the remote user profile administration process on the server system.

FIG. 6 depicts a preferred embodiment of the Remote User Profile Administration process as it occurs on the server system.

The DRAI procedure run on the database server is depicted. In step 200, the local variables are set in step 201, the SQL Data Area built in step 123, is parsed. In step 203, the UPM appropriate function is called based on the UPM action code passed in the INPUT SQLDA in the server remote procedure. In step 205, a test is performed to determine whether the UPM function completed successfully, e.g., a password change successful. If not, in step 207, an error is returned, i.e., the password change was not a success in the SQLCA. In step 209, the output SQLDA is set to indicate the type of error.

The syntax for the interface between UPM and Database Manager follows:

```
int far pascal                    /* REMOTE UPM ADMINIS-
                                     TRATION */
   sqladupm (unsigned char *,     /* Node name */
             unsigned short,      /* UPM action to be taken */
             void *,              /* SQLUPM data structures */
             struct sqlca *);     /* SQLCA pointer */
   parameters
```

Node Name—The node name at which the UPM action is to be executed.

UPM action—This is the UPM action to be executed. Valid input for this field are as follow:

SQL_ADD_USER—add a user to the UASDB.

SQL_DELETE_USER—delete a user to the UASDB.

SQL_LIST_USERS—list of current users from the UASDB.

SQL_GET_USER_INFO—return user information.

SQL_SET_USER_INFO—set user information for existing user.

SQL_CHANGE_PSWD—change the password for the user.

SQL_USER_GET_GROUPS—return a list of groups a user is a member of.

SQL_USER_SET_GROUPS—makes a user a member to a list of groups.

SQL_VALIDATE_USER—validates a user's password.

SQL_GET_MODALS—return user modal information.

SQL_SET_MODALS—set user modal information.

SQL_ADD_GROUP—add a group to the UASDB.

SQL_DELETE_GROUP—deletes a group from the UASDB.

SQL_LIST_GROUPS—returns a list of current groups.

SQL_GROUP_ADD_USER—adds a user to a group.

SQL_GROUP_DELETE_USER—deletes a user from a group.

SQL_SET_GROUP_INFO—sets group information for an existing group.

SQL_GET_GROUP_INFO—gets a group's information.

SQL_GROUP_GET_USERS—returns a list of users for a group.

SQL_GROUP_SET_USERS—sets a list of users as a member of a group.

SQLUPM—The SQLUPM data structures is used to supply information relative to the type of UPM action to be taken (add a user, delete a user, change the users password, etc.) and to supply information used by UPM.

Some examples of SQLUPM data structures are as follows:

```
struct sqlupm_user_info           /* USER INFORMATION STRUCTURE */
{
   unsigned char userid[8];       /* user's name */
   unsigned char comment[40];     /* user's comment/description*/
};
struct sqlupm_user                /* USER STRUCTURE */
{
   unsigned char userid[8];       /* user's name */
   unsigned char password[8];     /* user's password */
   unsigned char new_password[8]; /* user's new password*/
   bool password_required;        /* is user's password required*/
   unsigned short type;           /* user's type: USER,ADMIN*/
   unsigned char comment[40];     /* user's comment*/
   char far * buffer;             /* ptr to sqlupm struct or groupid*/
   unsigned short buflen;         /* size of buffer*/
   unsigned short entries;        /* number of entries received/sent*/
   unsigned short total_entries;  /* total entries available*/
};
struct sqlupm_modal               /* MODAL STRUCTURE */
{
   unsigned short min_password_length;  /* password length 0-8*/
   unsigned short max_password_age;     /* expiration age in seconds
*/
   unsigned short min_password_age;     /* minimum password age in
                                           seconds */
   unsigned short password_history;     /* reuse of previous passwords
                                           */
};
struct sqlupm_group_info          /* GROUP INFORMATION STRUC-
                                     TURE */
{
   unsigned char groupid[8];      /* group's name */
   unsigned char comment[40];     /* group's comment/description */
};
struct sqlupm_group               /* GROUP STRUCTURE */
```

```
{
    unsigned char groupid[8];            /* group's name*/
    unsigned char comment[40];           /* group's comment/description
                                            */
    char far * buffer;                   /* ptr to sqlupm struct or userid
                                            */
    unsigned short buflen;               /* size of buffer */
    unsigned short entries;              /* number of entries
                                            received/sent */
    unsigned short total_entries;        /* total entries available
                                            */
};
``` userid—The user ID to be affected by the action.
groupid—The group ID to be affected by the action.
comment—A 40 character string containing user or group information.
password—When action is set to SQL_CHANGE_PSWD, or SQL_VALIDATE_USER this field identifies the current password associated with the user ID. With any other action this field is ignored.
new_password—When action is set to SQL_CHANGE_PSWD, SQL_ADD_USER, or SQL_SET_USER_INFO this field identifies the new password to be associated with the user ID. With any other action this field is ignored.
password_required—When the action is set to SQL_ADD_USER or SQL_SET_USER_INFO this field can be set to TRUE indicating user must provide/have a password or FALSE indicating user has option not to have a password. With any other action this field is ignored.
type—When the action is set to SQL_ADD_USER or SQL_SET_USER_INFO this field is used to indicate whether the user is a USER or an ADMIN (administrator). With any other action this field is ignored.
buffer—This is a pointer to a storage area which can contain a userid, groupid, or a list of user_info or group_info structures:

| Action | Buffer representation | Status |
|---|---|---|
| SQL_LIST_USERS | sqlupm_user_info structure(s) | output |
| SQL_USER_GET_GROUPS | groupid[8] string(s) | output |
| SQL_USER_SET_GROUPS | groupid[8] string(s) | output |
| SQL_LIST_GROUPS | sqlupm_group_info structure(s) | output |
| SQL_GROUP_ADD_USER | userid[8] string | input |
| SQL_GROUP_GET_USERS | userid[8] string(s) | output |
| SQL_GROUP_SET_USERS | userid[8] string(s) | input |

Enough storage must be allocated for the expected size and/or number of structures being returned or sent. With any other action this field is ignored.
buflen—This field represents the size in bytes of the buffer storage (see buffer).
entries—When the action is SQL_LIST_USERS, SQL_USER_GET_GROUPS, SQL_LIST_GROUPS, or SQL_GROUP_GET_USERS this field indicates the number of userids, groupids, user_info structures or group_info structures returned based on the amount of storage provided in the buffer (see buffer and buflen). When the action is SQL_USER_SET_GROUPS, or SQL_GROUP_SET_USERS this field represents how many userids or groupids are being sent. With any other action this field is ignored.
total_entries—When the action is SQL_LIST_USERS, SQL_USER_GET_GROUPS, SQL_LIST_GROUPS or SQL_GROUP_GET_USERS this field indicates the total available number of existing userids, groupids, user_info structures or group_info structures. With any other action this field is ignored.
min_password_length—When the action is SQL_GET_MODALS or SQL_SET_MODALS this field indicates the minimum length a user can enter his password. This length can be from 0 to 8. (ex. If set to 4 then every user's password must be from 4 to 8 in length.)
max_password_age—When the action is SQL_GET_MODALS or SQL_SET_MODALS this field indicates the maximum age a password can be before it expires. The value, in seconds, of this field ranges from 0x0 to 0xFFFFFEFFF. If set to 0xFFFFFFFF then user's passwords will never expire.
min_password_age—When the action is SQL_GET_MODALS or SQL_SET_MODALS this field indicates the minimum amount of time that must elapse before a user can change his password. A value of 0 means that no delay is required.
password_history—When the action is SQL_GET_MODALS or SQL_SET_MODALS this field indicates the number of previous passwords a user is not allowed to use before he can reuse one. The values range from 0 to 8.
sqlca—The SQL communication area. This is the area where error information is returned.

A series of examples of a system user performing remote user profile administration, according to the present invention is provided in the following examples.

EXAMPLE 1

If the system administrator needs to delete a user USERID2, id, e.g., from the user profiles at node DOMAIN5, the sqlupm data structure should be set up as follows:

strcpy(sqlupm_user.userid,"USERID2");

rc=sqladupm("DOMAIN5",SQL_DELETE_USER,&sqlupm_user,&sqlca);

Referring back to FIG. 5 where the interface parameters are examined, the process would check if no name were valid, for example, where valid characters and valid length, at the UPM action requested is valid, that is among the list of actions which may be accomplished remotely, if the UPM action is valid for the SQLMUPM data structure and if all of the required fields in the SQLMUPM data structure were complete. In steps 103 through 121, the process sets up the data base connection to make the remote user profile function call at the remote node. In steps 123 through 129, the information for the data base remote application interface (DRAI) are prepared for the actions specified, in this case SQL_DELETE_USER, the appropriate UPM function i.e., NETUSERDEL is selected. Next in step 123, the pertinent UPM data is placed in the input SQLDA or the equivalent UPM function. In this case, the UPM data required is the user id. If a response is expected back under remote node, an output SQLDA is prepared in step 127 for returning this information. THE SQSCA is prepared so that return codes may be passed back from the remote procedure. The actual DRAI call will look like this: sqleproc ("NETAPI.DLL\\NetUserDel", vardata, insqlda, outsqlda, & slq * the vardata can be used to pass variable length information to a stored function. It is NULL in this example.

In steps 200 to 209, the UPM function is called (NetUserDel) at the remote database location. Any returned information is stored in the SQLDA and any returncodes are passed back in the SQLCA. Upon return from the remote database the client process checks the SQLCA in step 133 for errors. If there are none, then the client receives the data from the SQLDA in step 137, if any.

EXAMPLE 2

If the system administrator needs to change the password of a user USERID at node DOMAIN1 from PASSWORD to PASS the sqlupm_user data structure should be set up as follows:

```
strcpy(sqlupm_user.userid,"USERID");

strcpy(sqlupm_user.password,"PASSWORD");

strcpy(sqlupm_user.new_password,"PASS");

rc=sqladupm("DOMAIN1",SQL_CHANGE_PSWD,&sqlupm_
    user,&sqlca);
``` the set of commands means to copy the user id to the user id field of the SQLUPM_USER DATA STRUCTURE. The password is copied to the password field of the SQLM_ USER DATA STRUCTURE. The password is copied to the new password field of the SQM user data structure. The SQLADUPM is called to change the password at the main remote node domain1. The procedure as described above in connection with FIGS. 5A through 5B and example 1 are basically repeated. In the code sample above, the SQLADM is called to determine the number of all users at domain1. If the total number of users is greater than zero and the RC is not equal to zero, the bufflen field is set and the SQLUPM_ USER DATA STRUCTURE to the size of the SQLUPM_ USER_INFO structure for the number of users. The buffer is allocated in the SQLUPM_USER_DATA STRUCTURE then the SQLADUPM is called a second time to get the list of all users at domain1. The list of all users at DOMAIN1 is printed and the process exits.

EXAMPLE 3

If the system administrator would like add a new user USERID2 to the UASDB at node DOMAIN1 with a password of PASS the sqlupm_user data structure should be set up as follows:

```
strcpy(sqlupm_user.userid,"USERID2");

strcpy(sqlupm_user.password,"PASS");

sqlupm_user.password_required=TRUE;

sqlupm_user.type=USER;
```

```
strcpy(sqlupm_user.comment,"Userid2 is a user on Domain1");

rc=sqladupm("DOMAIN1",SQL_ADD_USER,&sqlupm_user,
    &sqlca);
```

EXAMPLE 4

If the administrator would like to receive the current list of users existing on node DOMAIN1 he would use the action SQL_LIST_USERS. To retrieve all the users, two calls to sqladupm are needed. The first call retrieves the total number of users from which to calculate the buffer size needed for retrieve the users. Then, the second call is made with the buffer size big enough to hold the users being returned. An example:

```
struct sqlupm_user_info *user_info;
unsigned short rc,i;
rc = sqladupm("DOMAIN1", SQL_LIST_USERS,
&sqlupm_user, &sqlca);
if(sqlupm_user.total_entries > 0) && (rc == 0)
{
    sqlupm_user.buflen = sizeof(struct
sqlupm_user_info)
        * sqlupm_user.total_entries;
    sqlupm_user.buffer = malloc(sqlupm_user.buflen);
    rc =
sqladupm("DOMAIN1", SQL_LIST_USERS, &sqlupm_user, &sqlca);
    if (rc == 0)
    {
        *user_info = *sqlupm_user.buffer;
        for(i=1;i<=sqlupm_user.entries;i++,user_info++)
        {
            printf("%s %s
/n",user_info->userid,user_info->comment);
        }
    }
}
```

EXAMPLE 5

If an administrator would like to reset an existing user's information, he would use the SQL_SET_USER_INFO action as follows:

```
strcpy( sqlupin_user.userid, "USER1");
strcpy(sglupm_user.password, "PASS1");
sglupm user.password_required = TRUE;
sqlupm_user.type = ADMIN;
strcpy(sglupm_user.comment, "User1 is administrator
for dept. 5");
rc =
sqladupm("DOMAIN1",SQL_SET_USER_INFO,&sqlupm_user,
&sqlca)
;
```

EXAMPLE 6

If an administrator needs to make sure that all users' passwords would expire every thirty days then he would use the SQL_SET_MODALS action as follows:

```
/*seconds in 30days = 60sec × 60min × 24hrs × 30days
    */
sqlup_modals.max_password_age = (60*60*24*30);
rc=qladupm("DOMAIN1",SQL_SET_MODALS,&sqlupm_modals,
    &sqlca
);
```

EXAMPLE 7

If an administrator wanted to add a user to a group then he could use the SQL_GROUP_ADD_USER action as follows:

```
strcpy(sqlupm_group.groupid, "GROUP5");
strcpy(userid, "USER1");
sqlupm_group.buffer = &userid;
rc=
sqladupm("NODE5",SQL_GROUP_ADD_USER,&sqlupm_group,
&sqlca)
;
```

EXAMPLE 8

If an administrator needed to add users USER25, USER26 and USER27 to GROUP7 he would use the SQL_GROUP_SET_USERS action as follows:

```
strcpy(sqlupm_group.groupid, "GROUP7");
sqlupm_group.buflen = 3*sizeof(userid);
sqlupm_group.buffer = malloc(sqlupm_group.buflen);
*user = *sqlupm_group.buffer;
strcpy(*user, "USER25");
for(j=0;j<=8;user++); /* move user ptr to next userid
location*/
strcpy(*user, "USER26");
for(j=0;j<=8;user++); /* move user ptr to next userid
location*/
strcpy(*user, "USER27");
sqlupm_group.entries = 3;
rc =
sqladupm("NODE7",SQL_GROUP_ADD_USERS,&sqlupm_group,
&sqlca
);
```

EXAMPLE 9

If an administrator needs to know all of the users in group GROUP10, then he would use the SQL_GROUP_GET_USERS action. The call must be made twice first to retrieve the number of users and second to get the userids.

```
unsigned char *user;
unsigned short rc,i,j;
rc = sqladupm("DOMAIN1", SQL_GROUP_GET_USERS,
&sqlupm_group, &sqlca);
if(sqlupm_group.total_entries > 0) && (rc == 0)
{
    sqlupm_group.buflen = sizeof(userid) *
        sqlupm_group.total_entries;
    sqlupm_group.buffer = malloc(sqlupm_group.buflen);
    rc =
sqladupm("DOMAIN1", SQL_GROUP_GET_USERS,&sqlupm_group,
    &sqlca);
    if (rc == 0)
    {
        *user = *sqlupm_group.buffer;
        for(i=1;i<=sqlupm_group.entries;i++)
        {
            printf("%s /n",*user);
            for(j=0;j<=8;user++); /* move user ptr to next
userid */
        }
    }
}
```

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A method for administering a remote user profile, comprising the steps of:

by a local copy of a distributed application, resident at the local system, constructing a message including a data structure for a remote user profile administration function in a syntax used by the distributed application;

by the local copy of the distributed application, sending the message to a remote copy of the distributed application resident at a remote system;

by a security system interface resident at the remote system, translating the message into a user profile administration function in a format used by a security system; and by the security system resident at the remote system, performing the user profile administration function to change a user profile at the remote system according to the translated message;

wherein the distributed application is a program independent of the security system.

2. The method as recited in claim 1 wherein the distributed application is a database management program.

3. A method as recited in claim 1 wherein the remote user profile administration function is to add a user.

4. A method as recited in claim 1 wherein the remote user profile administration function is to add a user group.

5. A method as recited in claim 1 wherein the remote user profile administration function is to delete a group access to a resource.

6. A method as recited in claim 1 is to reset a maximum age for user passwords at a remote node.

7. A method as recited in claim 1 is set a minimum length for a user password.

8. A system for administering a remote user profile, comprising:

a local copy of a distributed application for constructing a message including a data structure for a remote user profile administration function in a syntax used by a distributed application and for sending the message to a remote copy of the distributed application resident at a remote system;

a remote copy of the distributed application for receiving the message;

a security system interface resident at the remote system for translating the message into a user profile administration function; and a security system resident at the remote system for performing the user profile administration function to change a user access to resources at the remote system, wherein the security system interface translates the message into a format used by the security system and the security system performs the user profile administration function according to the translated message and wherein the security system is a program independent of the distributed application.

9. The system as recited in claim 8 wherein the distributed application is a database management program.

10. The system as recited in claim 8 further comprising:

a memory coupled to a system bus for storing sets of instructions to operate the system;

a processor coupled to the system bus for executing the sets of instructions; and a display for displaying results of the execution of the sets of instructions.

11. The system as recited in claim 10 further comprising:

a plurality of nodes on which copies of a distributed application, a security system interface and a security system reside on a computer system;

a network to which the plurality of nodes are coupled;

wherein each copy of the distributed application is used for constructing messages in a syntax used by a distributed application and for sending and receiving messages to and from remote copies of the distributed application resident at remote systems;

wherein at least one security system interface is used for translating a message into a user profile administration function; and wherein at least one security system is used for performing the user profile administration function to change a user access to resources so that the security system interface translates the message into a format used by the security system and the security system performs the user profile administration function according to the translated message.

12. The system as recited in claim 8 wherein the local copy of the distributed application further comprise means for requesting user profile information from the security system at the remote system.

13. The system as recited in claim 8 wherein the remote user profile administration function is to set a number of intervening passwords a user must input before reuse of a previous password is permitted.

14. A computer program product in a computer readable medium for administering a remote user profile in a distributed data processing system, comprising:

at least one copy of a distributed application including:

means for constructing a message including a data structure for a remote user profile administration function in a syntax used by the distributed application;

means for sending and receiving messages to and from copies of the distributed application resident at remote systems; and a security system interface including means for translating the message into a user profile administration function in a format used by a security system resident at a remote system;

wherein the security system interface communicates with a security system which includes means for changing user access to resources according to the translated message and wherein the distributed application is program independent of the security system.

* * * * *